(12) United States Patent
Narang et al.

(10) Patent No.: US 6,337,156 B1
(45) Date of Patent: *Jan. 8, 2002

(54) ION BATTERY USING HIGH ASPECT RATIO ELECTRODES

(75) Inventors: Subhash C. Narang; Susanna Ventura; Philip Cox, all of Menlo Park, CA (US)

(73) Assignee: SRI International, Menlo Park, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,313

(22) Filed: Jun. 2, 1998

Related U.S. Application Data

(60) Provisional application No. 60/068,764, filed on Dec. 23, 1997.

(51) Int. Cl.[7] .............................. H01M 4/48; H01M 4/52
(52) U.S. Cl. ................................ 429/218.1; 429/231.1; 429/231.3
(58) Field of Search ........................... 429/218.1, 231.8, 429/231.1, 231.2, 231.3

(56) References Cited

U.S. PATENT DOCUMENTS

| | | | | |
|---|---|---|---|---|
| 3,765,943 A | * | 10/1973 | Biagetti | |
| 3,864,167 A | * | 2/1975 | Broadhead et al. | |
| 5,100,747 A | * | 3/1992 | Hayashida et al. | 429/101 |
| 5,518,833 A | * | 5/1996 | Repplinger et al. | 429/59 |
| 5,527,641 A | * | 6/1996 | Koshiishi et al. | 429/163 |
| 5,654,115 A | * | 8/1997 | Hasebe et al. | 429/218.2 |

FOREIGN PATENT DOCUMENTS

| | | | |
|---|---|---|---|
| JP | 07-101728 | | 4/1995 |
| JP | 9-22693 | * | 1/1997 |
| JP | 9-147862 | * | 6/1997 |

* cited by examiner

*Primary Examiner*—Stephen Kalafut
*Assistant Examiner*—Jonathan Crepeau
(74) *Attorney, Agent, or Firm*—Fish & Associates; Robert D. Fish; Sandra Poteat Thompson

(57) ABSTRACT

Electrodes for secondary (rechargeable) batteries are fabricated using active material particles such as flakes, fingers, projections, needles, threads, fibers, pods, hairs, ribbons and the like, which have an aspect ratio of at least 1:3:1. The high aspect ratio, in combination with relatively shallow discharge cycles, provides high power of at least 800 W/kg sustainable over at least ten seconds, high energy of at least 7 W-hr/kg, and a high cycle life of at least 250 cycles. Selection of parameters also provides power to energy ratios for high power, high energy batteries of at least 10. Preferred chemistries for the novel batteries include lithium ion, and preferred active materials include carbon, metal oxides and metal. Batteries including the novel technology can advantageously be used in electric vehicles, consumer electronics, electrical appliances, and industrial applications such as battery backup systems and switches.

17 Claims, 1 Drawing Sheet

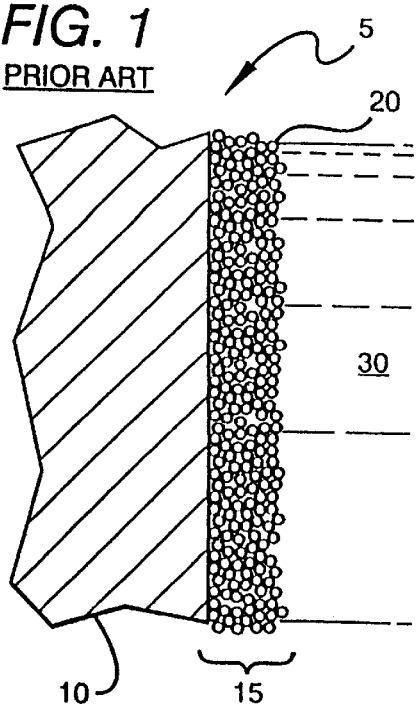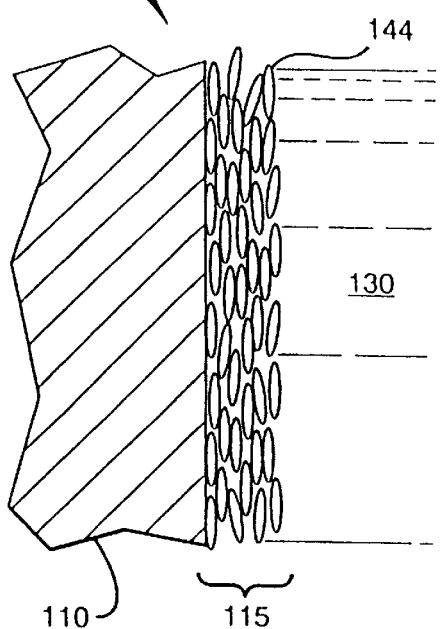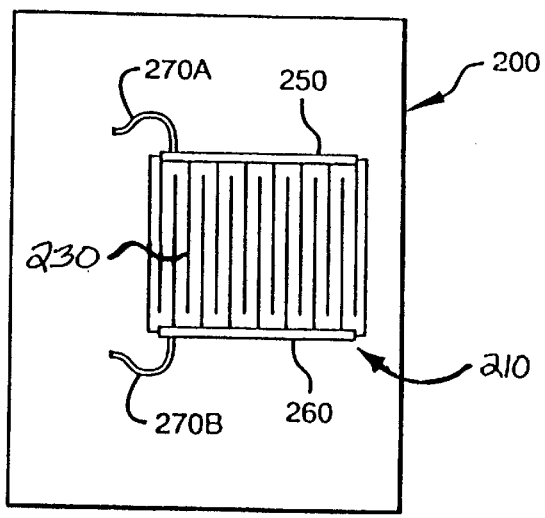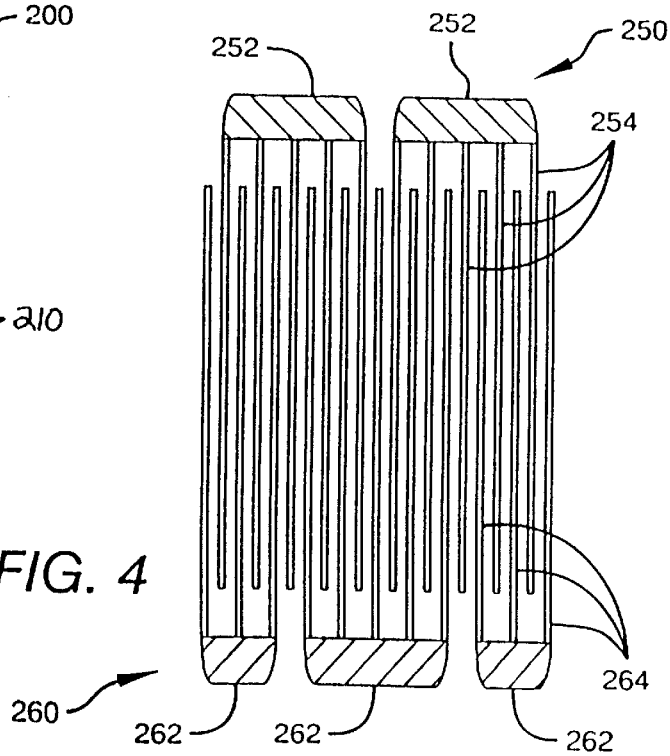

ION BATTERY USING HIGH ASPECT RATIO ELECTRODES

This application claims priority to co-pending provisional application Ser. No. 60/068,764 filed Dec. 23. 1997.

REFERENCE TO GOVERNMENT GRANT

This invention was made with Government support. The Government has certain rights in the invention.

FIELD OF THE INVENTION

The field of the invention is rechargeable batteries.

BACKGROUND

Secondary (rechargeable) batteries are utilized in a great variety of applications, including large mechanical devices such as electric vehicles, mobile or immobile battery backup systems, all manner of communications and electronic devices, and even individual electronic chips.

Depending on the particular application involved, it is generally advantageous to employ either a high power battery or a high energy battery. In some military applications, for example, such as where a projectile is propelled by magnetic forces, it is desirable to have a high power battery which delivers a large amount of energy over a very short period of time. In many other applications, such as industrial high torque valves, communication via satellite cellular phones, ignition systems, and medical defibrillation, it is also desirable to employ high power batteries. In contrast, high energy batteries are generally favored for portable consumer electronic devices such as lighting, portable computers and ground-based cellular telephones. In such applications energy is drawn from the battery relatively slowly over many hours, or even days.

There is a tradeoff between high power and high energy characteristics of batteries, and it is exceedingly difficult to produce high energy batteries which also have very high power. Among other things, a high cycle life which is generally desirable in high energy batteries becomes more difficult to achieve as the power increases. Such power/energy tradeoff is related in some measure to battery chemistry. A typical lead-acid battery, for example, may have a peak sustained power (over at least 10 seconds) of 500 W/Kg, and a total energy of 35 W-Hour/Kg at full discharge, where the weight in kg represents the total weight of the battery, less packing. In contrast, a typical lithium ion battery may have a peak sustained power of 250 W/kg, and a total energy of 125 W-Hour/Kg. Typical values for these and other chemistries using prior art technologies in batteries having a cycle life of at least 250 cycles are estimated in Table 1 below.

TABLE 1

| Chemistry | Electrolyte | Anode Material | Cathode Material | Peak Sustained Power (W/Kg) | Total Energy To Full Discharge (W-hr/Kg) |
|---|---|---|---|---|---|
| Lead Acid | Sulfuric Acid | Pb | $PbO_2$ | 300–400 | 35–50 |
| Lithium ion | Organic | Carbon | $LiM_xO_y$ | 200–250 | 100–125 |
| NiCd | Alkaline | NiOOH | Cd | 350–450 | 40–50 |

TABLE 1-continued

| Chemistry | Electrolyte | Anode Material | Cathode Material | Peak Sustained Power (W/Kg) | Total Energy To Full Discharge (W-hr/Kg) |
|---|---|---|---|---|---|
| $Li/TiS_2$ | Organic | Li | $TiS_2$ | 150–175 | 90–110 |
| NiMH | Alkaline | NiOOH | Metal alloys | 200–300 | 80–90 |

In addition to battery chemistry, the power and energy characteristics of a battery relate to morphology of the electrodes. Modem electrodes generally comprise fine spherical particles (approx. 20–50 microns) compacted together about a rod or sheet shaped conductive substrate. As such, there are really two different morphologies to be considered, the morphology of the individual particles (microscopic morphology), and the morphology of the entire electrode (macroscopic morphology).

The microscopic morphology greatly influences both power and energy capacity. In general, smaller particles provide a greater surface area and therefore a greater power, while larger particles provide a smaller surface area and less power. General assumptions regarding surface area are only true up to a point, however, because at some point finer particles pack less closely together, and tend to lose electrical contact with each other and the current collector. The packing effect observed with respect to finer particles, in turn, tends to yield less efficient utilization on a mass basis. In addition, smaller particles tend to be more difficult to pack onto the conductive substrate. The difficulty in packing smaller particles tends to yield less total mass of active electrode material than electrodes made with larger particles, which thereby tends to reduce total energy capacity.

The macroscopic morphology also has a considerable influence on both power and energy capacity. Thin film or interdigitated electrodes, for example, provide relatively large surface areas and therefore relatively high power, while simple tubular electrodes with relatively small surface areas tend to provide relatively low power. With respect to energy capacity, the key factor is not so much surface area, but the total mass of active electrode material that is in sufficient proximity to the electrolyte to receive mobile ions.

There are many known methods for coating a conductive substrate with an active electrode material. Typical methods include spray coating or spray deposition, and techniques along these lines are described in U.S. Pat. No. 5,721,067 to Jacobs et al. (February, 1998), U.S. Pat. No. 4,649,061 to Rangachar (1987), and U.S. Pat. No. 5,589,300 to Fateau et al. (1996). In general, spraying technologies include the use of ultrasonic or air spraying. Alternative coating methods such as roll coating, casting, electrospray, thermal spray, ultrasonic spray, vapor deposition, powder coating, etc. are also known.

One consequence of the known methods of fabricating electrodes is a trade-off between power and energy capacity. Known methods tend to deposit particles in layers on the conductive substrate, and since there is generally only point contact between adjacent particles in such layers, migration of ions from the electrolyte to the conductive substrate is slowed as the number of layers is increased. In this manner, attempts to increase power by reducing the particle size tends to increase the number of particle layers, and thereby reduce the energy capacity. As a result, a typical pawer/energy, or P/E, ratio for rechargeable batteries is about 3 $hr^{-1}$. Those skilled in the art will recognize that it is traditional in the field to omit the units, $hr^{-1}$, when describing power/energy ratios, and that tradition is generally followed hereinafter.

A trade-off between power and energy capacity may be satisfactory in many applications, but it may be undesirable in other applications. In power tools, hybrid vehicles, and cellular communications, for example, it is desirable to have both high power, defined herein to be at least 800 W/kg sustainable over a 10 second period, and high energy capacity, defined herein to be more than about 5 W-hour/kg at full discharge. In still other applications, it may be desirable to not only have high power and high energy capacity, but also to have a high power to energy capacity ratio, i.e., a high P/E ratio of 10, 20, 30 or more. Batteries that can fulfill all of these requirements, while maintaining relatively high cycle life are unknown. Thus, there is still a need for improved batteries, and methods of fabricating electrodes for such batteries.

SUMMARY OF THE INVENTION

In one aspect of the invention, methods and apparatus are provided in which rechargeable batteries having cycle life to deep discharge of at least 250 cycles provide power of at least 600 W/kg and energy of at least 5 W-hr/kg. In preferred embodiments such batteries provide power of at least 800 W/kg and at least 7 W-hr /kg, or at least 700 W/kg and at least 15 W-hr /kg. In still more preferred embodiments such batteries provide power of at least 1000 W /kg and at least 9 W-hr /kg, and at least 700 W-hr/kg and at least 20 W-hr /kg.

In another aspect of the invention, methods and apparatus are provided in which rechargeable batteries having cycle life to deep discharge of at least 250 cycles have a power to energy (P/E) ratio of at least 10. For some applications, more preferred embodiments have a P/E ratio of at least 20, still more preferred embodiments have a P/E ratio of at least 50, and still more preferred embodiments have a P/E ratio of at least 100.

In another aspect of the invention, electrodes in batteries are fabricated by providing electrodes with high aspect ratio subparts. In one class of embodiments the subparts comprise active material particles coated onto a conductive substrate. In another class of embodiments, the subparts comprise microplates extending from a conductive substrate.

These and other advantages and attainments of the present inventive matter will become apparent to those skilled in the art upon a reading of the following detailed description, when taken in conjunction with the drawings, wherein like components are referenced using like numerals.

BRIEF DESCRIPTION OF THE DRAWINGS

FIG. 1 is a schematic of a cross-section of a prior art conventional electrode.

FIG. 2 is a schematic of an electrode having an active material coating comprising high aspect ratio particles.

FIG. 3 is a schematic of a device having a battery according to one aspect of the present invention.

FIG. 4 is a schematic of an electrode having an active material coating formed into high aspect ratio microplates.

DETAILED DESCRIPTION

In prior art FIG. 1, a section of a rechargeable battery generally comprises an electrode 5 having a conductive substrate 10 upon which is deposited a coating 15. While only one electrode 5 is shown, another electrode (not shown) of different materials, but roughly similar construction is generally also present. Coating 15 is disposed in fluid contact with an electrolyte 30, and typically comprises fine particles 20, approximately 20–50 μm in diameter. Such particles 20 are generally spherical or pseudospherical, with aspect ratios in orthogonal x, y, and z axes averaging approximately 1:1:1.

The interaction between an active material and an electrolyte in a battery according to FIG. 1 is fairly well known. In the exemplary case of a lithium ion battery, lithium ions during charging would move rapidly through electrolyte 30 to become intercalated into the active material 15. Lithium ions would also move through the active material 15, but such movement is inherently slow in solids. The slow ion movement in solids creates a bottleneck for the movement of the lithium ions into the active material, which in turn reduces the power output capacity of currently available batteries.

In FIGS. 2 and 3 an electrode 105 according to aspects of the present inventive subject matter is disposed in contact with an electrolyte 130. As in the prior art, electrode 105 comprises a substrate 110 upon which is deposited an active material coating 115. Unlike the prior art, however, the coating 115 comprises particles having a relatively high average aspect ratio, which is defined herein to mean particles in which the longest dimension of the particle is at least three times the shortest orthogonal dimension. Thus, coating 115 may have particles of many different aspect ratios, but on average (using a mass basis) such aspect ratios may be 1:3:1, 1:3:3, 1:7:4, or even higher. As used herein, the term "higher" as applied to aspect ratios refers primarily to the ratio between the longest and the shortest orthogonal dimensions, and then secondarily to the ratio between the medium and shortest orthogonal dimensions. Thus, a ratio of 1:10:8 is considered to be greater than a ratio of 1:9:8, which in turn is considered to be greater than a ratio of 1:9:7.

Many different examples of suitable conductive substrates 110 are known in the art. Exemplary materials for such substrates include copper, aluminum, nickel, and steel. Many different morphologies are also known, including conductive substrates in the form of cylindrical structures, grids, and foils.

Coating 115 is preferably deposited onto substrate 110 in a single layer, measuring from about 0.1–10 μm thick. It should be appreciated that the actual number of layers of flakes employed may vary considerably from electrode to electrode, and from battery to battery.

There are many different active materials which can be incorporated into coating 115, including those known in the prior art. Examples are pure elements such as lithium, nickel, zinc, or metal oxides such as lithium cobalt oxide, lithium manganese oxide, lithium nickel oxide, and lithium nickel cobalt oxide. Active materials may also include, tin, tungsten and aluminum. Metal sulfides, carbon, and conductive polymers may also be used as active material for battery electrodes. Particularly preferred active materials are $LiCoO_2$ and $LiNiO_2$.

Deposition of the active material onto the current collector substrate is contemplated to take place by any suitable means. This includes ultrasonic or air spray coating, and exemplary techniques are described in the U.S. Pat. No. 4,649,061 to Rangachar (1987) and U.S. Pat. No. 5,589,300 to Fateau et al. (1996). Alternative methods include roll coating, casting, electrospray, thermal spray, ultrasonic spray, vapor deposition, and powder coating. Regardless of the method, the goal is to deposit the active material onto a metallic core or other substrate to provide high conductivity and structural strength, preferably in a form which allows infiltration by the electrolyte to provide what is known in the art as a flooded porous structure.

Electrolyte 130 may occur in any form, including liquid, semi-solid, or even solid. Of course, the electrolyte must cooperate with the active electrode materials to provide chemical reactions which store and release electrical energy, and many such chemistries are already known. Thus, for lithium ion batteries, the electrolyte is generally selected from a lithium ion conducting chemical such as lithium hexafluorophosphate in ethylene carbonate and dimethyl carbonate. Also, for safe operation of the cell, the electrolyte may advantageously be chosen from a non-flammable group of chemicals. Examples of other combinations are set forth in Table 1.

With particular reference to FIG. 2, coating 115 has a thickness corresponding to about 5–10 or more high aspect particles. The particles may or may not be aligned as shown. The particles are shown as flakes 144, which are intended to be depicted as having an average aspect ratios of about 1:3:9. Still more preferred particles may have even higher aspect ratios, such as where the longest dimension of the particle is at least five, ten, twenty or thirty times the shortest orthogonal dimension. Accordingly, high aspect ratio particles employed in coating 115 are not limited to flakes as shown, or even flakes at all, but may alternatively include fingers, projections, needles, threads, fibers, pods, hairs, ribbons and the like. Still further, it is contemplated that high aspect ratio particles may be curled or curved.

In terms of absolute size, it is contemplated that high aspect ratio particles may advantageously have a longest dimension of about 50 microns, and a shortest dimension of about 1 to about 7 microns. At present, preferred high aspect particles in the flake form have average dimensions of about 2 by 5 by 20 $\mu$m.

High aspect particles can be fabricated in many different ways. In a preferred method suitable for preparing metal oxide flakes, a flexible, temperature-resistant plastic is coated with a metal oxide precursor such as a lithium metal alkoxide. The precursor is then converted by heating or other energy to its corresponding lithium metal oxide while still coated on the plastic, and the plastic is stretched to flake the oxide. The process is analogous to that used for making metal flakes for use in packaging, however, here the method produces flaked metal oxides as opposed to flaked metals. Other electroactive intercalation materials such as carbon and metal chalcogenides can be fabricated using analogous methods.

High aspect ratio particles can be deposited onto a substrate using conventional methods such as coating, spraying, casting, electrospray, thermal spray, ultrasonic spray, vapor deposition, powder coating, and so on. In such methods, the particles are preferably mixed with a conductive filler and a polymer binder. Ideally, the flakes would be applied on the electrodes to achieve physical alignment in which particles of any given layer have multiple point contact with a particles of adjacent layer(s).

In FIG. 3, a generic battery powered device 200 includes a battery 210 according to one aspect of the present invention. The battery 210 has cathodes 250 and anodes 260 having interdigitated microplates separated by an electrolyte 230. Cables 278A and 278B electrically couple the battery 210 to a motor or other drain (not shown).

As better viewed in FIG. 4, a preferred cathode 250 generally has a plurality of current collector portions 252, and a plurality of high aspect ratio microplates 254. Both components can be fabricated from any suitable material, with the presently preferred material for collector portions 252 for lithium ion batteries being elemental aluminum, and the presently preferred material for microplates 254 for lithium ion batteries being $LiNiO_2$ or $LiCoO_2$.

A preferred anode 260 also generally has a plurality of current collector portions 262, and a plurality of high aspect ratio microplates 264. Again these components can be fabricated from any suitable material, with the presently preferred material for collector portions 262 for lithium ion batteries being elemental copper, and the presently preferred material for microplates 264 for lithium ion batteries being graphite or coke.

The microplates 254, 264 are contemplated to have aspect ratios at least as high as that previously described for high aspect ratio particles. In a preferred embodiment, for example, microplates 254, 264 may have an average thickness of about 1–10 $\mu$m, may extend 100 $\mu$m or more away from the respective collector portions 252, 262, and may extend a decimeter or more in a third direction. Adjacent microplates 254, 264 are contemplated to be separated from each other by about only tenths of a micron or less, with a presently preferred distance of about 0.1 (A). Microplates 254, 264 can be prepared in numerous ways, including lithographic printing type processes. (see Polymers in Microlithography, Amer. Chem. Soc, ACS Symposium 1989).

Virtually any cell chemistry, including especially all of the chemistries set forth in Table 1, can be used for fabricating rechargeable batteries having electrodes incorporating high aspect ratio active material particles or microplates. Two particularly preferred cell chemistries include a lithiated oxide cathode, and either a titanium disulfide or a carbon anode. Experimental batteries fabricated as described herein based on titanium disulfide have achieved a cell voltage of about 2.4 V, produced power of at least about 1000 W/kg (sustainable over at least 10 seconds), and provided total energy of about 9.4 W-h/kg. This yields a P/E ratio of about 106. Batteries using the higher voltage couple of carbon and a lithiated oxide have also been fabricated to produce power of 700 W/kg and energy of 23 W-h/kg. This yields a P/E ratio of about 30. Cycle life for both of these experimental batteries are estimated at thousands of cycles. Other particularly contemplated batteries are based upon sodium, potassium, lead, proton, nickel-cadmium, and nickel-metal-hydride chemistries.

In still other experiments using lithium ion batteries, modifying the number and thicknesses of layers of active material on the electrodes, using different active electrode materials, and modifying the aspect ratios of the active electrode materials, the parameters in Table 2 have been achieved:

TABLE 2

| Active Electrode Materials | Thickness of coating (μm) | Est. Avg. Aspect Ratio | Peak Sustainable Power (≧10 sec) (W/kg) | Energy at Peak Power (W-hr/Kg) | Total Energy to to Full Discharge (W-hr/kg) | P/E Ratio (hr$^{-1}$) |
|---|---|---|---|---|---|---|
| Coke | 240 | 1 × 5 × 10 | 1,500 | 18 | 40 | 75 |
| Graphite | 170 | 1 × 1 × 100 | 1,500 | 25 | 80 | 60 |
| LiCoO$_2$ | 230 | 1 × 100 × 100 | | | | |
| TiS2 | 325 | 1 × 5 × 10 | 1,000 | 9.5 | 40 | 105 |

In an exemplary fabrication, a lithium ion battery was prepared as follows: A battery housing was filled with a laminate comprising a titanium disulfide anode onto a nickel current collector, lithium cobalt oxide cathode onto an aluminum current collector and separator containing the liquid electrolyte. The titanium disulfide anode electrode was fabricated from a slurry containing 90 g of the anode active material, 5 g of acetylene black and 5 g of KYNAR™ (Elf Atochem: poly(vinyledene fluoride)). 2822. The slurry was suspended in cyclohexanone (300 mL) and sprayed onto a current collector in multiple layers. Each layer was dried at 80° C. for 20 to 30 minutes before the successive layer was applied. This procedure was repeated until the desired loading was achieved. About ten layers were applied. The titanium disulfide anode was used as such after drying. The packing density of this anode was 0.7 g/mL. The LiCoO$_2$ cathode electrode was fabricated from a slurry containing 80 g of the cathode active material, 10 g of acetylene black, and 10 g of KYNAR™ 741. The slurry was suspended in a solvent such as cyclohexanone and sprayed onto a current collector held at 80° C. in multiple layers. Each layer was heated to 160° C. The procedure was repeated till the desired loading was achieved. About ten layers were applied. The resulting cathode electrode was hot-pressed to minimize its resistance. The packing density of the resulting cathode was 2.0 g/mL. The electrode was laminated against a glass fiber separator and the laminate was filled with a 1M solution of LiPF$_6$ in EC/DMC 2:1.

In another example a graphite/LiCoO$_2$ cell was fabricated as follows. Anode fabrication: KYNAR™ 2822 (12 g) was dissolved in N-methylpyrrolidone (NMP) (225 g), and to this mix graphite (88 g) and HYPERMER KD-1™ (ICI Surfactants: a non-ionic surfactant) (0.2 g) were added. The resulting slurry was mixed in a double planetary mixer at 10 rpm for 48 hours. The mix was coated onto a copper current collector using an automatic coater. The oven drying temperature was 115° C. and the coating was applied at a rate of 12 cm/min. The copper current collector was coated on both sides. 47 cm×5.5 cm anodes were cut using a cutter and slitter. The electrode was hot-pressed onto calendering rolls at 140° C. Cathode fabrication: "KYNAR™" 2822 (6.5 g) was dissolved in NMP (120 g), and to this mix lithium cobalt oxide (88 g) and HYPERMER KD-1™ (0. 1 g) were added. The resulting slurry was mixed in a high shear mixer. The mix was coated onto an aluminum current collector using an automatic coater. The oven drying temperature was set at 150° C. and the coating was applied at a rate of 12 cm/min. The current collector was coated on both sides. 47 cm×5.5 cm anodes were cut using a cutter and slitter. The electrode was hot-pressed onto calendering rolls at 140° C. Tabs were welded onto the electrodes, then the electrodes were dried before battery assembly. A laminate of the anode, separator (CELGARD™ (Hoechst Cenanase: A microporous flat sheet membrane of polypropylene or polyethylene) 2400) and cathode were wound with automatic winder and transferred into an 18650 can. After addition of the liquid electrolyte, the 18650 cell was sealed.

Turning to the limited discharge aspect of the inventive subject matter, it is contemplated that devices contemplated herein will be subjected to repeated depth of discharge of less than 60% of full charge, and in more preferred embodiments devices will be subject to repeated depth of discharge of less than 50%, 40% or even 30% of full charge. As used herein, the term "repeated depth of discharge" refers to the depth of discharge generally encountered in ordinary service. Thus, for example, if a battery is generally discharged to between 30% and 40% of full charge, but is occasionally discharged to perhaps 75% or even 100%, the battery would still be considered to be subjected to repeated depth of discharge of only about 40% of full charge.

Apparatus and methods of monitoring and controlling the amount of discharge are known, although previously such apparatus and methods have been applied to ensure that batteries are fully discharged before recharging, or to estimate the run time left in a particular device. Presently preferred methods include the coulomb counters of U.S. Pat. No. 5,372,898 to Atwater et al. (1994) and U.S. Pat. No. 5,640,150 to Atwater (1997).

It appears that limiting the depth of discharge to no more than 60% of full charge allows batteries incorporating electrodes with high aspect ratio active material coatings to be cycled a very high number of times. Projections from recent experiments with lithium ion batteries place such cycle life at between 10,000 and 50,000 cycles, or more. While not limiting ourselves to any particular theory to explain such phenomena, it is presently contemplated that the improved performance disclosed herein results at least in part from increased electrode stability. During normal cycling the intercalation-deintercalation of electrodes causes the active material to undergo volume changes. This swelling and contraction of the electrode volume cause a strain on the electrode structure, which eventually leads to significant delamination or exfoliation of the electrode structure. Delamination or exfoliation of the electrode structure, in turn, limits cycle life.

Batteries according to the inventive subject matter herein are particularly contemplated to be used in applications where both high power output and high total energy output may be advantageous, as well as a high cycle life. Thus, generic battery powered device 200 is contemplated to represent in the alternative: power tools including electric drills, screw drivers and nail guns; vehicles including electrically powered and hybrid electric vehicles; consumer electronic applications including portable phones, camcorders, and laptop computers; consumer electrical appliances including portable cordless vacuum cleaners, hedge clippers and lawn mowers; and all manner of other battery operated devices, including industrial applications such as battery backup systems, battery operated valves, and so forth.

Thus, specific embodiments and applications of ion batteries having high aspect ratio electrodes have been disclosed. It should be apparent, however, to those skilled in the art that many more modifications besides those already described are possible without departing from the inventive concepts herein. The inventive subject matter, therefore, is not to be restricted except in the spirit of the appended claims.

We claim:

1. A rechargeable battery having a deep discharge cycle life of at least 250 comprising:

at least two electrodes and an electrolyte, operatively coupled to deliver at least X watt/kg of power sustainable over at least 10 seconds, and a total energy capacity of at least Y Watt-hours/kg, where X is at least 600 and Y is at least 5; and at least one of the electrodes having a conductive substrate coated with flakes that have a longest dimension of about 20 $\mu$m of metal oxide material.

2. The battery of claim 1 wherein X is at least 700 and Y is at least 15.

3. The battery of claim 1 wherein X is at least 700 and Y is at least 20.

4. The battery of claim 1 wherein X is at least 800 and Y is at least 7.

5. The battery of claim 1 wherein X is at least 1000 and Y is at least 9.

6. The battery of claim 1 having a P/E ratio of at least 10.

7. The battery of claim 1 having a P/E ratio of at least 20.

8. The battery of claim 1 having a P/E ratio of at of at least 30.

9. The battery of claim 1 having a P/E ratio of at least 35.

10. The battery of claim 1 having a P/E ratio of at least 10, and wherein at least one of the electrodes comprises an active electrode material fabricated from a plurality of subparts havingy an average aspect ratio on a mass basis of at least 1:A:B, where A is at least 3 and B<=A.

11. The battery of claim 1 having a P/E ratio of at least 20, and wherein at least one of the electrodes comprises an active electrode material fabricated from a plurality of subparts having an average aspect ratio on a mass basis of at least 1:A:B, where A is at least 3 and B$\leq$A.

12. The rechargeable battery of claim 1 having an electrolyte comprising lithium ions.

13. A transportation vehicle having a battery according to claim 1 having a P/E ratio of at least 10, and wherein at least one of the electrodes comprises an active electrode material fabricated from a plurality of subparts having an average aspect ratio on a mass basis of at least 1:A:B, where A is at least 3 and B<=A.

14. A consumer electronic device having a battery according to claim 1 having a P/E ratio of at least 10, and wherein at least one of the electrodes comprises an active electrode material fabricated from a plurality of subparts having an average aspect ratio on a mass basis of at least 1:A:B, where A is at least 3 and B<=A.

15. An electrical appliance having a battery according to claim 1 having a P/E ratio of at least 10, and wherein at least one of the electrodes comprises an active electrode material fabricated from a plurality of subparts having an average aspect ratio on a mass basis of at least 1:A:B, where A is at least 3 and B<=A.

16. A battery backup system having a battery according to claim 1 having a P/E ratio of at least 10, and wherein at least one of the electrodes comprises an active electrode material fabricated from a plurality of subparts having an average aspect ratio on a mass basis of at least 1:A:B, where A is at least 3 and B<=A.

17. A rechargeable battery having an electrode comprising a conductive substrate coated with flakes that have a longest dimension of about 20 $\mu$m of a metal oxide material.

\* \* \* \* \*